United States Patent [19]

Schneider et al.

[11] 4,359,756
[45] Nov. 16, 1982

[54] CHROMINANCE SIGNAL LIMITER

[75] Inventors: Dennis M. Schneider, Carmel; John G. Amery, Danville, both of Ind.

[73] Assignee: RCA Corporation, New York, N.Y.

[21] Appl. No.: 278,662

[22] Filed: Jun. 29, 1981

[51] Int. Cl.³ .................... H04N 9/535; H04N 9/493
[52] U.S. Cl. ........................................ 358/27; 358/330
[58] Field of Search .......................... 358/4, 11, 27, 31

*Primary Examiner*—John C. Martin
*Attorney, Agent, or Firm*—E. M. Whitacre; J. S. Tripoli; R. G. Coalter

[57] ABSTRACT

A filter separates a composite video input signal into luminance and chrominance signal components. DC signals are combined with the luminance signal to produce four control signals, first and fourth ones of which have an AC component inversely proportional to the luminance signal, second and third ones of which having an AC component directly porportional to the luminance signal, each having a respective DC component. The DC components of the first and third control signals are regulated in proportion to a first reference voltage, V1, and the DC components of the second and fourth ones of the control signals are regulated in proportion to a second reference voltage V2. Cascade connected complementary non-additive mixers limit excursions in a first sense of the chrominance signal to the lesser in that sense of the first and second control signals and limits excursions in a second sense of the chrominance signal to the lesser in that sense of the third and fourth control signals to thereby provide a limited chrominance output signal. The luminance and chrominance signals are combined to provide a composite video output signal limited to a range defined by the reference voltages V1 and V2 and in which the chrominance component of the output signal is limited symmetrically with respect to the luminance signal level, thereby reducing even order harmonic distortion of the chrominance signal under limiting conditions.

10 Claims, 13 Drawing Figures

$S_1 = \bar{L} + V_1 \quad S_2 = L + V_2 \quad S_3 = L - V_1 \quad S_4 = \bar{L} - V_2$

CHROMINANCE SIGNAL LIMITER

This invention relates to video signal processing apparatus and particularly to apparatus for limiting amplitude excursions of a composite video signal.

In certain color picture information processing systems, it is advantageous to employ FM techniques in the transmission of video information. See, for example, U.S. Pat. Nos. 3,934,263; 4,022,968; and 4,005,474, which disclose video disc recording arrangements in which a recording signal is formed which includes a picture carrier wave modulated in frequency in accordance with the amplitude of a composite color video signal inclusive of luminance and chrominance signal components.

In such video disc (or tape) recording systems, bandwidth limitations of the recording media can limit the modulation index for the higher frequency components of the video signal to such an extent that a signal-to-noise ratio reduction may occur for signal frequency components near the higher end of the modulating signal band. For this reason, it is conventional practice in disc and tape recording systems to translate the chrominance signal from its normal location at the upper end of the luminance band to a lower frequency so that the chrominance component does not suffer a signal-to-noise ratio loss. Pritchard, in U.S. Pat. No. 3,872,498, discloses translating systems which interleave or "bury" the chrominance signal within the midband portion of the luminance signal band. This technique is commonly referred to as "buried subcarrier" (BSC) encoding and prevents degradation of the chrominance signal-to-noise ratio for the reasons mentioned above.

While the chrominance signal-to-noise ratio may be preserved (or improved) by means of buried subcarrier encoding, a different approach is used to overcome the loss which may occur for higher frequency luminance signal components. Conventionally, the luminance signal is subjected to high frequency preemphasis prior to modulation of the FM carrier so that a signal-to-noise ratio improvement may be realized when a complementary high frequency deemphasis is imparted to the luminance component of the FM carrier (e.g., in a disc or tape player). To prevent the preemphasized luminance signal from causing excessive carrier deviation of the frequency modulator some form of video signal limiting is needed. In a known method of composite video signal limiting the luminance signal is clipped at predetermined levels and summed with the chrominance signal to form a composite signal which is then clipped and applied to the modulator.

It has been found that when a composite video signal is limited by clipping its peaks at fixed levels and used, for example, to drive the cutterhead of a video disc mastering lathe, certain undesirable effects may be observable in a picture produced when the mastering substrate or a pressed disc is played back and displayed on a television receiver or monitor. In particular, it has been found that for certain program material the chrominance content of the picture may tend to undesirably influence the picture luminance level and flesh tones may tend to exhibit an unnatural hue.

A substantial reduction in chrominance-luminance signal interference and hue shifts may be realized by controllably compressing the chrominance signal in the manner proposed by Wharton et al. in their copending U.S. Patent application entitled "Video Signal Processing Apparatus", Ser. No. 190,082 which was filed Sept. 23, 1980, now U.S. Pat. No. 4,316,213. In the Wharton et al. apparatus, the chrominance component of a composite video signal is compressed in response to peaks in excess of a given value of a control signal. The control signal is derived from a selected one of (1) the chrominance component of the composite video input signal, (2) a sum of the chrominance component of the composite video input signal and the preemphasized luminance signal and (3) the output composite video signal produced by the apparatus.

The technique of controlled chrominance signal compression of Wharton et al. provides a desirable reduction of even order harmonic distortion of the chrominance signal. This is particularly advantageous where the video signal is of the buried subcarrier format proposed by Pritchard and in which the chrominance signal subcarrier choice is such that its second harmonic falls within the luminance signal band. A visual effect of the presence of the undesired second harmonic of the chrominance signal in the luminance signal band is the formation of picture anomolies such as vertical bars or variations of brightness with the level of color saturation.

Notwithstanding the advantage of the controlled chrominance signal compression technique proposed by Wharton et al., a need exists in video signal limiting apparatus for further reduction in even order harmonic distortion of the chrominance component of a composite video signal. A need also exists for simplified and precise control of the peak amplitude limits of the processed composite video signal. The present invention is directed to meeting these needs.

Video signal processing apparatus in accordance with the present invention includes filter means for separating a composite video input signal into a luminance signal and a chrominance signal. Control signal generator means responsive to the luminance signal produces four control signals, first and fourth ones of the control signals having an AC component inversely proportional to the luminance signal, second and third ones of the control signals having an AC component directly proportional to said luminance signal, each control signal having a DC component. Regulator means in the generator means regulates the DC components of the first and third control signals in proportion to a first reference voltage, V1, and regulates the DC components of the second and fourth control signals in proportion to a second voltage, V2. Circuit means, responsive to the four control signals, limits excursions in a first sense of the chrominance signal to the lesser, in the first sense, of the first and second control signals and limits excursions in a second sense of the chrominance signal to the lesser, in the second sense, of the third and fourth control signals, to thereby form a symmetrically limited chrominance output signal. Output means combines the luminance signal component with the symmetrically limited chrominance output signal to provide a composite video output signal.

The invention is illustrated in the accompanying drawings wherein like reference designators denote like elements and in which.

Figure 1:
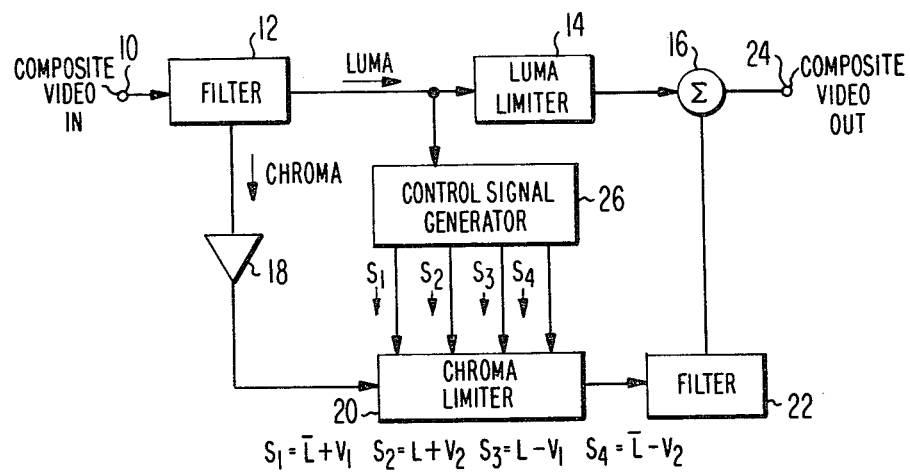
FIG. 1 is a block diagram of video signal processing apparatus embodying the invention.

The apparatus of FIG. 1 is useful in applications where it is desired to confine excursions of a baseband color video signal to a predetermined range of values and where, under limiting conditions, minimizing of color distortion is desired. Such applications include baseband transmission systems (e.g., closed circuit video monitoring) as well as carrier transmission systems (e.g., AM broadcast TV transmitters, FM video disc or tape recorders, etc.) in which it is desired that the signal supplied to the FM or AM carrier wave modulator be limited to prevent excessive deviation or overmodulation. As will be explained, the chrominance component of the composite video signal is controlled in such a manner that it exhibits symmetry with respect to the luminance signal component under limiting conditions and the composite video output signal is confined to predictable and independently controllable limits.

The processor comprises an input terminal 10 for receiving a composite video input signal inclusive of a luminance signal component and a chrominance signal component. Terminal 10 is connected to the input of a filter 12 which separates the composite signal into its luminance (Luma) and chrominance (Chroma) signal components. Illustratively, filter 12 may comprise the combination of a low pass filter (for Luma) and a high pass filter (for Chroma), such filters being well known. Preferably, however, filter 12 is of the comb filter type to provide maximum filtering efficiency (i.e., signal separation). Comb filters for separating luminance and chrominance signals are well known. See, generally, U.S. Pat. No. 3,872,498 of Pritchard and U.S. Pat. No. 3,966,010 of Kawamoto which disclose high performance comb filters suitable for use in video disc apparatus.

The luminance signal produced by filter 12 is supplied via a path including a luminance signal limiter 14 to one input of a summing circuit 16. Limiter 14 limits the luminance signal amplitude to fixed levels and may comprise a conventional diode or common base connected transistor voltage limiter or "clipper" circuit. Such circuits are well known. It is desirable that the luminance signal limiting levels be selected to be substantially equal to the constant components, $V_1$ and $V_2$, of signals generated for controlling the chrominance signal limits as will be explained subsequently.

The chrominance signal produced by filter 12 is supplied via a path including an amplifier 18, a chrominance signal limiter 20 and a filter 22 to a second input of summing circuit 16 which combines the signals supplied to it to provide a composite video output signal at output terminal 24. Amplifier 18 amplifies the chrominance signal relative to the luminance signal which, as previously mentioned, is desirable for improving the chrominance signal-to-noise ratio in disc or tape recording systems. Where such improvement is not needed, amplifier 18 may be omitted from the processing system. The chrominance signal limiter 20 is of a type which limits excursions in a first sense (e.g., positive excursions) of the chrominance signal to the smaller, in the first sense, of two control signals, $S_1$ and $S_2$, supplied thereto and which limits excursions in a second sense (e.g., negative excursions) of the chrominance signal to the lesser, in the second sense, of two further control signals, $S_3$ and $S_4$, supplied thereto. A suitable implementation of a limiter having the above characteristics is described subsequently.

Filter 22 attenuates harmonics of the output signal of chroma limiter 20 which may be produced when the chrominance input signal exceeds the limits defined by the four control signals $S_1$–$S_4$. This is a particularly desirable feature in applications where the chroma carrier is to be converted to the buried subcarrier format proposed by Pritchard and in which the new subcarrier frequency choice is such that harmonics of the converted subcarrier may fall within the luminance signal band. Where the chrominance signal is not subjected to such further processing, filter 22 may be omitted. For purposes of harmonic attenuation, filter 22 may be of the low pass, band pass or trap type, all being well known filter forms.

The four control signals which control the limits of chroma limiter 18 are all derived from the luminance signal produced by filter 12 by means of a control signal generator 26. The signal relations are:

$$S_1 = L + K_1 \quad (1)$$

$$S_2 = \overline{L} + K_2 \quad (2)$$

$$S_3 = L - K_3 \quad (3)$$

$$S_4 = \overline{L} - K_4 \quad (4)$$

In equations 1–4 L is a signal directly proportional to the AC component of the luminance signal, $\overline{L}$ is a signal inversely proportional to the AC component of the luminance signal. The signals K1–K4 are DC signals wherein K1 and K3 are regulated to equal a voltage $V_1$ and K2 and K4 are regulated to equal a voltage $V_2$. The voltages $V_1$ and $V_2$ control the limits of the composite video signal and are chosen to equal the upper and lower limits, respectively, of the luminance signal limiter 14. A suitable implementation of control signal generator 26 is described subsequently.

FIGS. 4–10 provide a detailed illustration of the overall operation of the processor of FIG. 1 under the assumed conditions that: (1) the gain of amplifier 18 is times three ($\times 3$); (2) the composite video input signal supplied to terminal 10 is an NTSC color bar pattern of moderately high brightness level (75% Luma) and of moderately high color saturation level (75% Chroma); and (3) the desired upper and lower limits of the composite video signal are 144 and −77 IRE units, respectively. The assumed values of amplifier gain and video signal limits have been found advantageous in video disc mastering applications but other gain and limiting conditions may be preferable in other applications.

The composite video input signal choice is arbitrary but serves to illustrate relatively typical signal levels of color television program material (full levels of brightness and saturation occur relatively infrequently in typical program material). The specific choice of 75% brightness and color saturation is also convenient in that it is a standard test signal format available on conventional color bar generators. Such generators have been found useful in the alignment and testing of the signal processor. As to alignment, the limits of the luminance signal limiter are adjusted to the desired output signal limits of +144 and −77 IRE units. The regulated constant component $V_1$ of $S_1$ and $S_3$ is set to a value (i.e., a voltage level) equivalent to the upper limit of +144 IRE units and the regulated constant component $V_2$ of $S_2$ and $S_4$ is set to a value corresponding to −77 IRE units.

Figure 4:
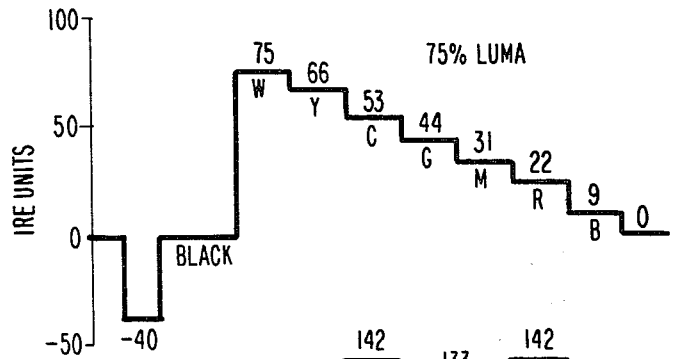
FIGS. 4–10 are waveform diagrams illustrating certain aspects of operation of the apparatus of FIGS. 1-3.
Figure 5:
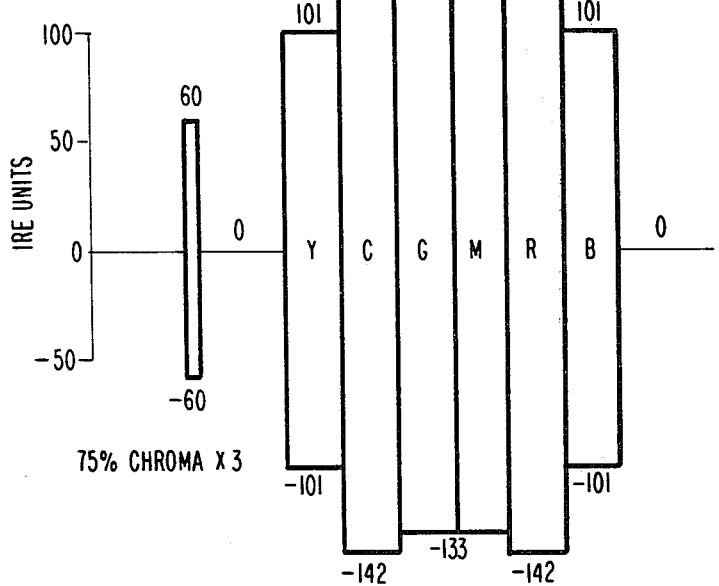

FIGS. 4 and 5 illustrate the waveforms of the luminance signal component produced by filter 12 and the chrominance signal component produced at the output of amplifier 18, respectively, for the assumed conditions. As seen from FIG. 4, the luminance signal varies between −40 IRE units during the sync tip interval to 75 IRE units during the white (W) bar interval. The luminance levels for yellow (Y), cyan (C), green (G), magenta (M), red (R), and blue (B) are 66,53,44,31,22 and 9 IRE units, respectively. In FIG. 5 the 75% saturated and times three amplified chrominance signal is seen to be symmetrical about the zero IRE unit axis and has peak values for burst and the six color bars Y, C, G, M, R, and B of 60, 101, 142, 133, 133, 142, and 101 IRE units, respectively.

Figures 6, 7:
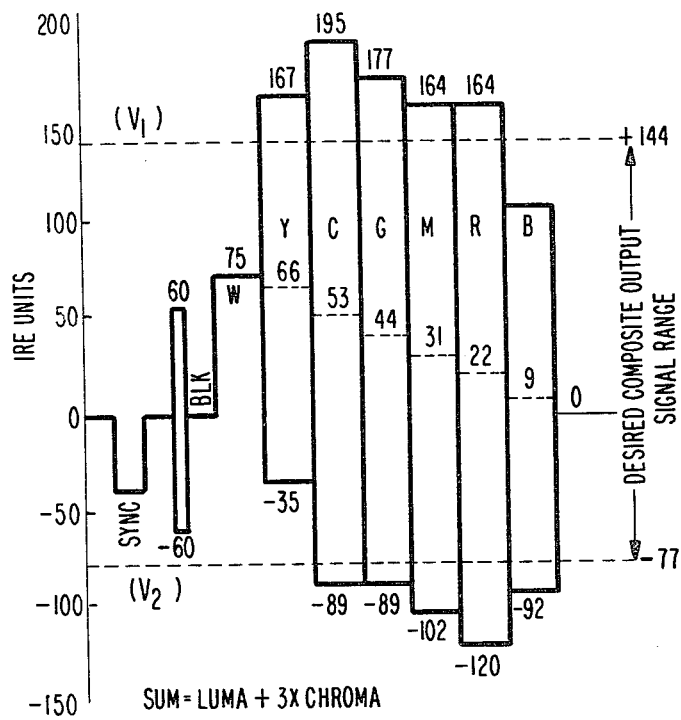

FIG. 6 illustrates the undesirable effect which would result if the waveforms of FIGS. 4 and 5 were combined and applied to a conventional fixed level limiter or clipper circuit having limiting levels of +144 and −77 IRE units. The yellow color bar, for example, having peaks of 167 and −35 IRE units would be clipped only in the positive sense at a level of 144 IRE units. Its average value therefore would be (144-35)/2 or 54.5 IRE units. That value differs from the value of the luminance signal component (66 units) by 15.5 units and thus the yellow color bar will not be symmetrical with respect to the luminance signal level. An effect of this asymmetry is creation of even order harmonic distortion products. For the specific example given, all of the color bars, if clipped at levels of 144 and −77 IRE units will exhibit asymmetry with respect to the luminance signal component.

Figure 8:
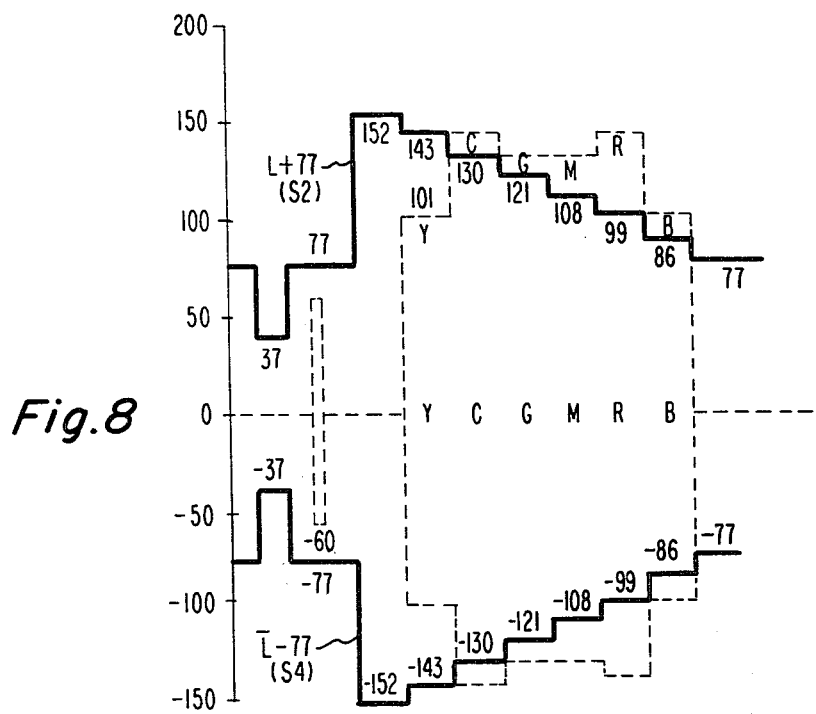

FIGS. 7 and 8 illustrate the waveforms of the control signals $S_1$–$S_4$ for the assumed color bar pattern and with the amplified chrominance signal (drawn in phantom). Chroma limiter 20 limits the maximum excursions of the chrominance signal in the positive sense to the lesser, in that sense, of $S_1$ and $S_2$. Chroma signal excursions in the negative sense are limited to the smaller, in that sense, of $S_3$ and $S_4$. From FIGS. 7 and 8, it is seen that $S_1$ and $S_3$ are smaller, respectively, than $S_2$ and $S_4$ for the color bars Y, C, and G. Accordingly, for those bars, the chrominance signal is symmetrically limited by the control signals $S_1$ and $S_3$ to peak values of 78, 91, and 100 IRE units by limiter 20. The signals $S_2$ and $S_4$ are smaller, respectively, than $S_1$ and $S_3$ for the color bars M, R, and B so that for those color bars the chrominance signal component is limited to peak values of 108, 99, and 86 IRE units.

Figure 9:
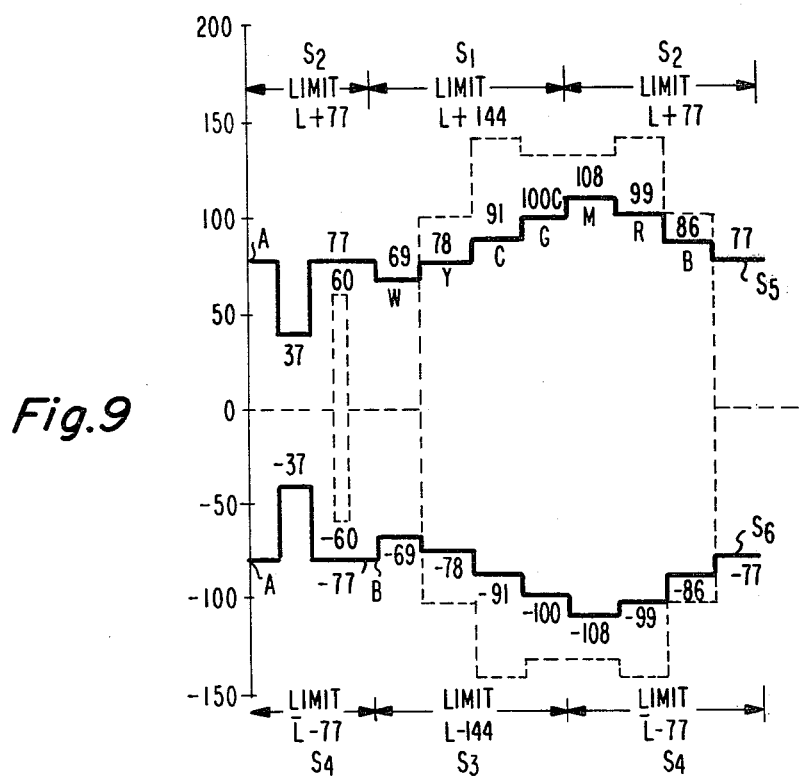

FIG. 9 illustrates the combined effects of the limiting waveforms of FIGS. 7 and 8 on the amplified chrominance signal (drawn in phantom). Waveform $S_5$ represents the smaller of $S_1$ and $S_2$ in the positive sense and waveform $S_6$ represents the smaller of $S_3$ and $S_4$ in the negative sense. That portion of the chrominance signal more positive than the upper waveform, $S_5$ is truncated or clipped by chroma limiter 20. Similarly, that portion of the chrominance signal more negative than $S_6$ is truncated or clipped by chroma limiter 20. As is apparent, the upper and lower limiting waveforms exhibit mirror image symmetry with respect to the zero IRE unit axis. Accordingly, no direct current component is introduced into the chrominance signal by the limiting process and even order harmonic distortion of the chrominance is relatively low.

Figure 10:
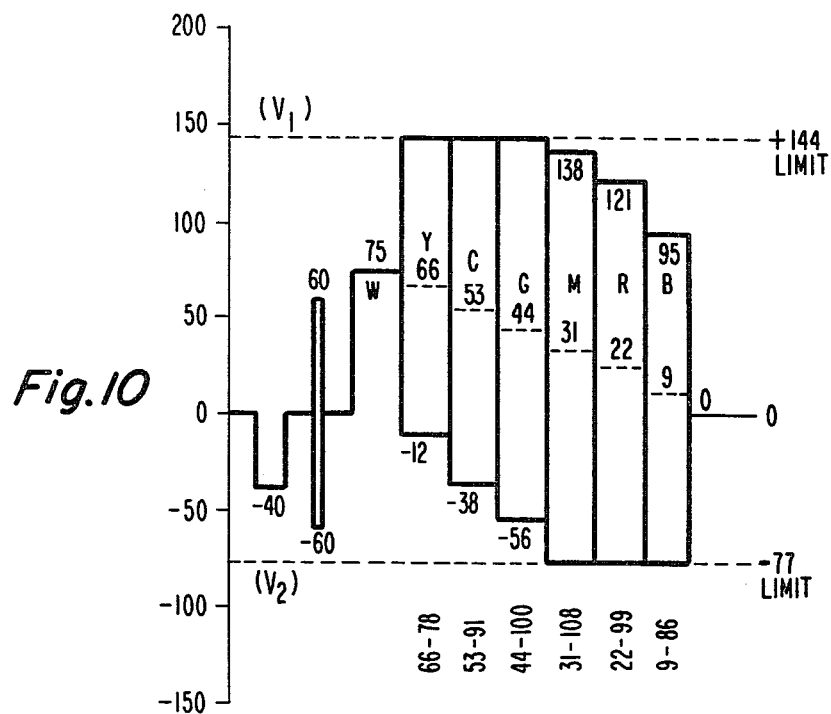

FIG. 10 represents the composite video output signal produced by summing circuit 16 which combines the luminance signal (FIG. 4) and the processed chrominance signal. It is apparent that: (1) the average value of the composite signal for each color bar equals the level of the luminance signal component; and (2) the peak amplitude of the composite video signal never exceeds the illustrative limiting values of +144 and −77 IRE units. Thus, even though each of the color bars is reduced in saturation level, the reduction is symmetrical with respect to the luminance signal level and is by an amount that confines excursions of the composite video output signal to the desired limiting range. Advantageously, each limit of the range may be independently controlled without affecting the other limit by selection of the constant component $V_1$ of the signals $S_1$ and $S_3$ or the constant component $V_2$ of the signals $S_2$ and $S_4$. $V_1$ determines the limit in the positive excursion sense and $V_2$ determines the limit in the negative excursion sense.

Figure 2:
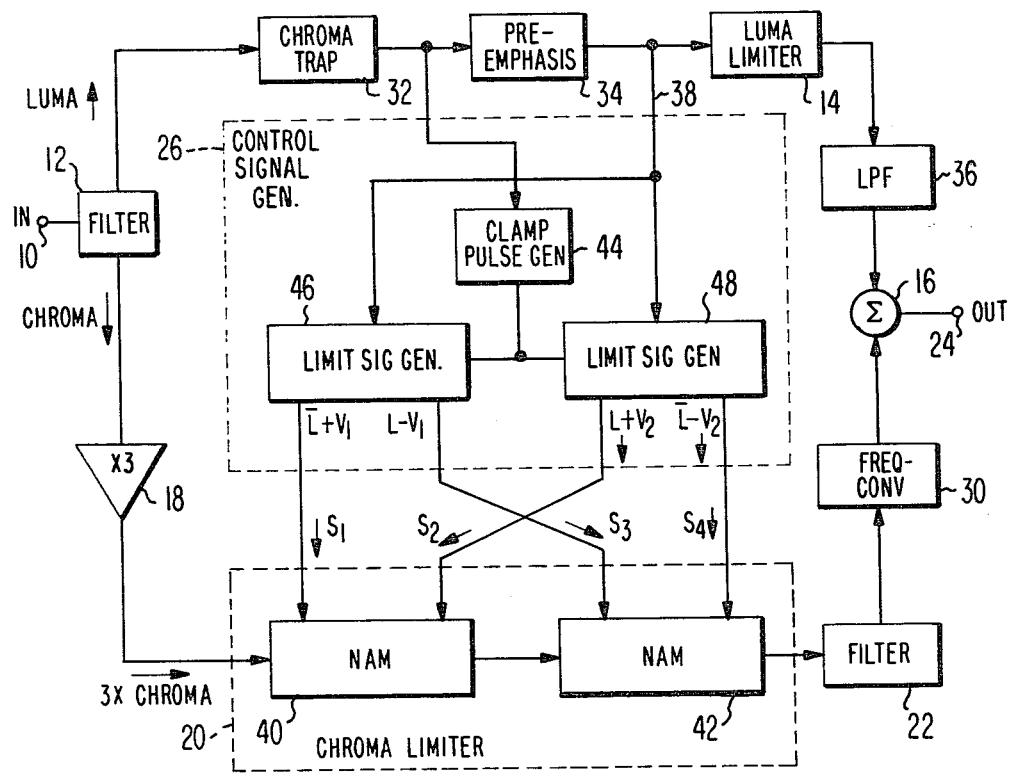
FIG. 2 is a block diagram of the apparatus of FIG. 1 modified for use in video disc mastering applications.

The apparatus of FIG. 1 has been modified in the example of FIG. 2 to provide buried subcarrier encoding and luminance signal preemphasis which, as previously explained, improves the video signal-to-noise ratio in video disc (or tape) recording systems. Buried subcarrier encoding is facilitated by interposing a frequency converter 30 in the chrominance signal path between the output of filter 22 and the second input of summing circuit 16. Converter 30 is preferably of the heterodyne conversion type and translates the processed chrominance signal subcarrier to a lower frequency within the luminance signal band thereby improving the chrominance signal-to-noise ratio for the reasons previously mentioned and described in greater detail in the aforementioned Pritchard patent.

As proposed by Pritchard, the new chrominance subcarrier frequency choice should be selected such that the chrominance signal spectrum is interleaved with that of the luminance signal. A suitable subcarrier frequency choice would be one incorporating a half line rate offset such as 195/2 times the horizontal line frequency. For processing an NTSC format video input signal in "real time" this would correspond to 1.534,091 Hz or about 1.53 MHz. For a PAL 50/626 format video signal, a suitable choice would be on the order of about 1.52 MHz (for mastering at less than "real time" rates, the frequency choices should be proportionally reduced by the "slow down" factor, e.g., divided by two for half rate mastering applications).

It is particularly advantageous that converter 30 follow filter 22 in the chrominance signal path. There are two reasons for this choice. First, filter 22 removes harmonics from the processed chrominance signal which may be introduced by limiter 20 and therefore minimizes generation of spurious signals in converter 30 which might otherwise fall within the luminance signal band (e.g., 0–3.0 MHz). Second, if frequency conversion were performed prior to limiting, the harmonics generated during limiting conditions would be of lower frequencies and thus would be more difficult to remove by filter 22.

The luminance signal path in FIG. 2 is modified to include a cascade connection of a chrominance signal trap circuit 32 and a preemphasis circuit 34 interposed in the path between the luminance signal output terminal of filter 12 and the input of luminance signal limiter 14. A low pass filter 36 is also interposed in the path between the output of luminance signal limiter 14 and the first input of summing circuit 16.

Trap circuit 32, illustratively, may comprise an LC band reject filter tuned to the subcarrier frequency (3.58 MHz for a real time recording system for NTSC program material) and provides the function of removing residual chrominance signal components which might be present in the luminance signal produced by filter 12. Accordingly, the control signals $S_1$–$S_4$ are substantially free of any chrominance signal components and depend only on the luminance and the constant components as previously described. This avoids any undesirable alteration of the limits of the composite video signal for changes in the chrominance signal level and thus ensures that the limits depend only on the two constants $V_1$ and $V_2$ and the luminance signal level as previously described. Where filter 12 provides a substantially chrominance free luminance signal, trap circuit 32 may be omitted. As an alternative, trap circuit 32 may be interposed in conductive path 38 between the output of preemphassis circuit 34 and the input of control signal generator 26. This alternative has the advantage that residual chrominance signal components are removed from the control signals but the frequency and phase characteristics of the main luminance signal processing path are not influenced or degraded by the presence of the trap circuit.

The function of preemphasis circuit 34 is to enhance the higher frequency components of the luminance signal so that a signal-to-noise ratio improvement may be realized when the signal is later recovered from a video disc record and subjected to complementary deemphasis. Illustratively, circuit 34 may comprise a resistance-capacitance or a resistance-inductance type of lead-lag network with element values selected to provide a lead break point at 0.25 MHz, a lag break point of 1.0 MHz and a slope of 6 dB/octave to provide a net boost of 12 dB to the higher frequency luminance signal components.

For purposes of chrominance signal limiting, it is highly desirable that the luminance signal components of the control signals $S_1$–$S_4$ also receive preemphasis. For this reason, conductor 38, which supplies the luminance signal to generator 26, is connected to the output of preemphasis circuit 34. It is not essential, however, to obtain the luminance signal for generator 26 in this manner and one may, if desired, include a separate preemphasis circuit within generator 26 if desired. The reason for imparting preemphasis to the signal supplied to generator 26 is to facilitate matching of the dynamic characteristics of the signal in the main luminance signal processing path with those of the variable components of the control signals. By this means, overshoots, undershoots and other dynamic characteristics of the luminance component of the composite video output signal are compensated for by complementary limiting characteristics of the chrominance signal so that the composite video output signal is constrained to maximum limits determined only by the constant components of the control signals.

The function of low pass filter 36 is to attenuate high frequency luminance signal components which may be formed when the luminance signal exceeds the limits (+144 and −77 IRE units) of limiter 14. The cutoff or corner frequency of filter 36 should be higher than the desired luminance signal bandwidth (e.g., 3.0 Mhz) and, preferably, the delay characteristics should be selected to be substantially constant through the major portion of the luminance signal pass-band. If the delay characteristics of the path including filter 36 differs substantially from those of the path including filter 22 and converter 30, it is possible that misregistration of the chrominance and luminance components of the composite video output signal may result. Such a problem may be avoided by the addition of a delay equalizer to the path having the shorter delay.

Figure 11:
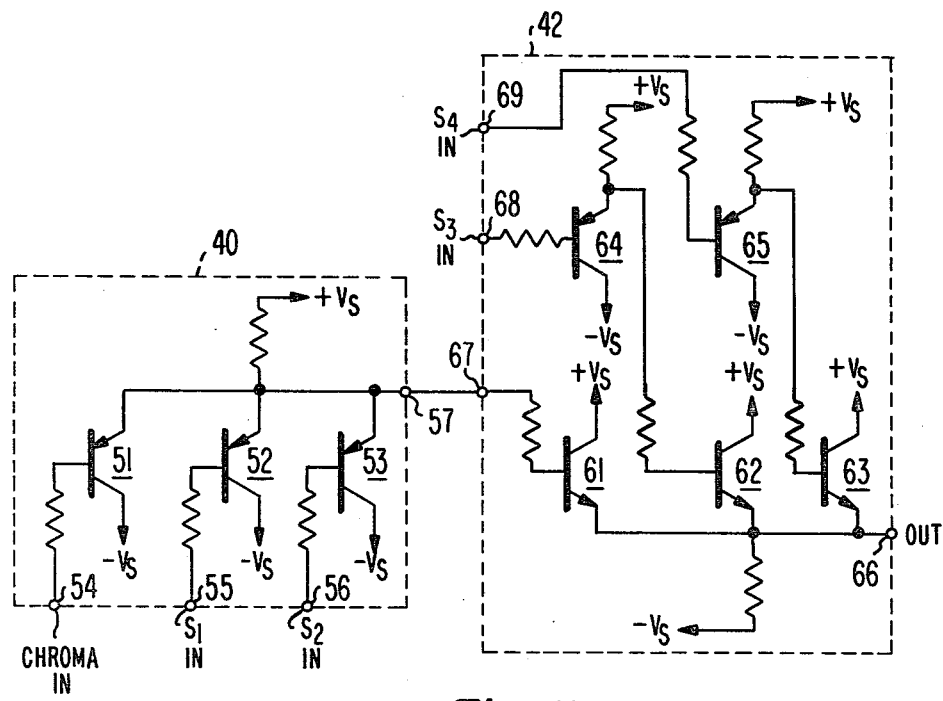
FIGS. 11–13 are diagrams of circuits suitable for use in practicing the invention.

The remaining elements of FIG. 2 illustrate preferred implementations of control signal generator 26 and chrominance signal limiter 20 (each outlined in phantom). Limiter 20 comprises a cascade connection of a pair of three-input, complementary, non-additive mixers 40 and 42. The mixers may be of the passive type (e.g., complementary diode gate circuits) but preferably are of the active type employing complementary transistors as shown in FIG. 11 and discussed subsequently. The signals $S_1$, $S_2$ and the chrominance signal produced by amplifier 18 are applied to respective inputs of the first non-additive mixer 40 of the cascade connection. The diode polarities or the transistor conductivity types of mixer 40 are selected such that the less positive of the three input signals is coupled to its output terminal and supplied to one input terminal of the second mixer 42. The control signals $S_3$ and $S_4$ are supplied to the remaining input terminals of the second mixer 42 and its output terminal is connected to the input of filter 22. The diode polarities or transistor types used in the second mixer are reversed relative to those in the first mixer so that the less negative of its input signals is conducted to its output terminal.

Control signal generator 26 (outlined in phantom) comprises a clamp pulse generator 44 having an input terminal coupled to the output terminal of chrominance signal trap circuit 32 and an output terminal coupled to a clamp pulse input terminal of each of two limit signal generators, 46 and 48, each of which has a luminance signal input terminal coupled via conductor 38 to the output terminal of preemphasis circuit 34. Generator 46 supplies the signals $S_1$ and $S_3$ to mixers 40 and 42, respectively, and generator 48 supplies the signals $S_2$ and $S_4$ to mixers 40 and 42, respectively.

Clamp pulse generator 44 is responsive to the non-preemphasized luminance signal supplied thereto for producing and supplying relatively narrow (e.g., 3 microsecond) pulses to generators 46 and 48 during the "back porch" portion of the horizontal synchronizing pulse period of the video input signal. During this period, the luminance signal component is at "back level" (0 IRE units) and the pulses so supplied enable circuits in generators 46 and 48 to compare the d.c. components of the control signals with reference voltages and produce feedback signals which regulate the d.c. components. By this means, generator 26 is automatically recalibrated at the beginning of each horizontal line period, thereby counteracting any tendency for the d.c. components ($V_1$ and $V_2$) of $S_1$–$S_4$ to drift. This feature is particularly advantageous in that changes in the d.c. component of the composite video input signal applied to terminal 10 are also automatically compensated for so that one may connect terminal 10 to various signal sources (e.g., tape recorders, frame stores or other video signal sources) without the necessity of recalibration for each video signal source.

For video disc mastering, terminal 10 would be connected to a video signal source (e.g., a tape recorder for real time mastering or a "slow down processor" for mastering at less than real time rates) and terminal 24 would be connected to the frequency modulator of a video disc mastering recorder. The constant component $V_1$ of the signals produced by generator 46 would be set to the upper limit (illustratively, +144 IRE units) of the modulator deviation range and the constant component $V_2$ of the signals produced by generator 48 would be set to the lower limit (illustratively, −77 IRE units) of the modulator deviation range.

Operation of the processor of FIG. 2 is substantially the same as in the example of FIG. 1 except for the previously described functions provided by the added elements. The waveforms of FIGS. 4–10 also apply to this example of the invention with the exception that the preemphasis imparted to the luminance signal will tend to cause luminance signal peaking during rapid signal transitions. Since the control signals $S_1$ to $S_4$ are all dependent upon the preemphasized luminance signal, the effect is that when the luminance signal is peaked (i.e., tends to overshoot or under shoot on transitions) the maximum chrominance signal limits will be proportionally reduced. Under limiting conditions, therefore, the peaked luminance signal will cause the chrominance signal envelope to be rounded so that the sum of the two signals will always lie within the range bounded by the predetermined constants $V_1$ and $V_2$.

Figure 3:
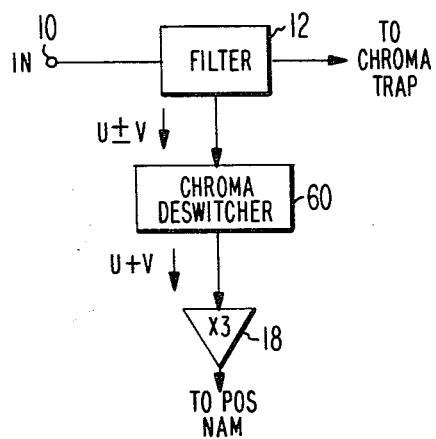
FIG. 3 is a block diagram illustrating a modification of the apparatus of FIG. 2 to facilitate processing of PAL format video signals.

As explained in U.S. Pat. No. 4,200,881 of Carnt et al. and U.S. Pat. No. 4,136,358 of Clemens et al., it is advantageous to employ buried subcarrier encoding and to inhibit the chrominance signal line-to-line phase alternation in video disc mastering of PAL format video signals. The apparatus of FIG. 2 may be modified as shown in FIG. 3 to provide such a video signal format by interposing a chrominance signal "deswitcher" 60 in the chrominance signal path between the output of filter 12 and the input of limiter 20. In FIG. 3 the chrominance deswitcher 60 precedes amplifier 18 and, illustratively, may be of the demodulator-remodulator kind such as those disclosed in the Carnt et al. and Clemens et al. patents. Alternatively, it may be of some other suitable type such as the multiplying or the sampling kind. As an alternative, deswitcher 60 may be interposed in the chrominance signal path between the output of filter 22 and the second input of summing circuit 16.

FIG. 11 illustrates a preferred circuit implementation of non-additive mixers 40 and 42. Mixer 40 comprises PNP transistors 51, 52 and 53 having base electrodes coupled via respective resistors to respective input terminals 54, 55, and 56. The base coupling resistors provide current limiting for suppression of parasitic oscillations. Transistors 51–53 are connected at the collector electrodes thereof to receive a source of negative supply voltage $-V_s$ and at the emitter electrodes thereof to an output terminal 57 that is coupled to receive a source of positive supply voltage $+V_s$ via an emitter load resistor.

Non-additive mixer 42 is complementary to mixer 40 and comprises three NPN mixer transistors 61, 62, and 63 and two PNP offset voltage compensating emitter follower transistors 64 and 65. The collector electrodes of transistors 61-63 are coupled to receive the positive supply voltage $+V_s$ and the emitter electrodes are connected to an output terminal 66 and coupled via an emitter load resistor to the negative supply voltage source $-V_s$. Input terminal 67 is coupled to output terminal 57 of mixer 40 and to the base of transistor 61 via a base coupling resistor. Input terminals 68 and 69 are coupled via respective base coupling resistors to respective base electrodes of emitter follower transistors 64 and 65 which are connected at the collector electrodes thereof to receive the negative supply voltage $-V_s$. The emitter electrodes of transistors 64 and 65 are coupled to respective base electrodes of transistors 62 and 63 via respective base coupling resistors and to the source of positive supply voltage $+V_s$ via respective emitter load resistors.

The base coupling resistors in each of the non-additive mixers 40 and 42 may be equal valued (120 Ohms, illustratively). It is preferred that the emitter load resistors be equal valued (2700 Ohms, illustratively) for purposes of base-emitter offset voltage (Vbe) compensation as will be explained subsequently. To further facilitate the offset voltage compensation, it is preferable that the transistor types be selected to exhibit similar offset voltages for similar values of emitter current. If desired, all emitter load resistors may be replaced by constant current sources to further reduce offset voltage differences and the transistors may be mounted in close proximity one to another or thermally coupled together to minimize offset voltage differences due to temperature dependent variations of Vbe.

In operation, the chrominance input signal and the control signals $S_1$, $S_2$, $S_3$, and $S_4$ are applied to terminals 54, 55, 56, 68, and 69, respectively. If $S_1$ and $S_2$ are positive with respect to the chrominance input signal, PNP transistors 52 and 53 will be turned off and transistor 51 will be turned on, thereby producing an output signal at terminal 57 equal to the chrominance input signal plus Vbe of transistor 51. If $S_3$ and $S_4$ are negative with respect to the output voltage of mixer 40 $-V_{BE}$, then transistors 62 and 63 will be turned off and transistor 61 will be turned on. Since the base emitter voltage drop, $V_{BE}$, of transistor 62 is equal to but of opposite polarity to that of transistor 51, the offset voltage added to the chrominance signal by transistor 51 will be cancelled so that the chrominance input signal will appear at output terminal 66 with substantially no offset.

The next example illustrates how offset compensation of the control signals is provided and how the chrominance signal is limited in the positive excursion sense by the less positive of the control signal pair $S_1$ and $S_2$ and limited in the negative sense to the less negative of the control signal pair $S_3$ and $S_4$. Assume that $S_1$ is 3 volts, that $S_2$ is 2 volts, that $S_3$ is 1 volt and that $S_4$ is −1 volt. Assume initially that the chroma signal is in the range between 1 and 2 volts. In this case, the chrominance signal voltage will be less positive than $S_1$ and $S_2$ and less negative than $S_3$ and $S_4$. Accordingly, as in the previous example, transistors 52, 53, 62, and 63 will all be turned off, transistors 51 and 61 will be turned on and the chrominance input signal will be coupled to output terminal 66 with essentially no offset voltage since the $V_{be}$ of PNP transistor 51 cancels that of NPN transistor 61 (the $V_{be}$ of PNP transistors 64 and 65 similarly cancels that of NPN transistors 62 and 63, respectively).

Now assume that the chrominance signal has a positive peak exceeding 2 volts and negative peaks exceeding 1 volt. For the positive peaks transistor 51 will be turned off. Since $S_2$ (2 volts) is less positive than $S_1$ (3 volts), transistor 52 will be turned on and transistor 53 turned off so that the output voltage at terminal 57 will equal $S_2$ (2 volts plus the $V_{be}$ of transistor 53). For negative peaks, the chrominance signal will be less positive than either $S_1$ or $S_2$ so that the voltage at terminal 57 will equal the chrominance signal plus the $V_{be}$ of transistor 51. Accordingly, under these conditions non-additive mixer 40 limits the positive peaks of the chrominance signal to the lesser of $S_1$ and $S_2$ and adds an offset to the output voltage equal to one base emitter voltage drop, $V_{be}$.

The emitter follower transistors 64 and 65 in non-additive mixer 42 also add a 1 $V_{be}$ potential to the control signals $S_3$ and $S_4$. Accordingly, for positive peaks of the chrominance signal, the base voltage of transistor 61 will equal 2 volts plus $V_{be}$, that of transistor 62 will equal 1 volt plus $V_{be}$ and that of transistor 63 will equal $-1$ volt plus $V_{be}$. Since the base of transistor 61 is less negative than that of transistors 62 and 63, then these transistors will be turned off and the output voltage at terminal 66 will equal 2 volts plus the $V_{be}$ of transistor 51 minus the $V_{be}$ of transistor 62 which equals 2 volts or the assume value of the control signal $S_2$.

For negative peaks, the voltage at the base of transistor 61 will equal the value of the chrominance signal plus the $V_{be}$ of transistor 51. Since it is assumed that the negative peaks are at a potential less than 1 volt, the base voltages of transistors 61, 62, and 63 will be 1 volt+$V_{be}$ 51, 1 volt+$V_{be}$ 64 and $-1$ volt+$V_{be}$ 65, respectively. Accordingly, transistors 61 and 63 will be biased off, transistor 62 will be conductive and the output voltage at terminal 66 will thus equal 1 volt+$V_{be}$ 64−$V_{be}$ 62 or the assumed value of the control signal $S_3$.

Summarizing the foregoing examples, excursions in a positive sense of the chrominance input signal applied to terminal 54 are limited to the smaller in the positive sense of the control signals $S_1$ and $S_2$. Chrominance signal excursions in a negative direction are limited to the less negative of the control signals $S_3$ and $S_4$. Since the transfer function of the limiter depends only on relative voltage levels, it is not necessary that the limiter be supplied with both positive and negative supply voltages. One may, for example, choose a value of zero volts (i.e., ground potential) for the supply $-V_s$ and operate the limiter with a single power supply for $+V_s$. In that case, all the control signals and the chrominance signal would be positive voltages with respect to ground and negative with respect to $+V_s$. One may also reverse the supply voltages and transistor conductivity types if desired and reverse the order of the cascase connection.

Figure 12:
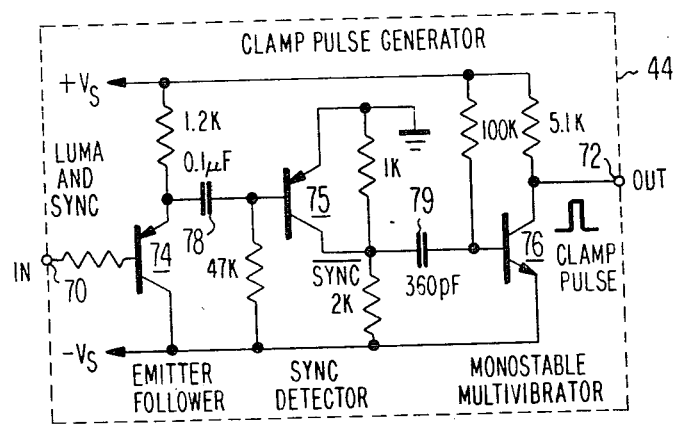

FIG. 12 illustrates a preferred circuit implementation of clamp pulse generator 44. The circuit comprises an input terminal 70 for receiving the luminance signal, an output terminal 72 for providing clamp pulses and three transistors 74, 75, and 76. PNP transistor 74 is connected as an emitter follower to provide a relatively low source impedance for common emitter connected transistor 75 which functions as a sync pulse detector. Common emitter connected transistor 76 serves as a monostable multivibrator triggered by sync detector transistor 75 and provides the output pulses to terminal 72.

In operation, the luminance input signal is buffered by transistor 74 and negative going sync pulses are coupled via a d.c. blocking capacitor 78 to the base of transistor 75. Transistor 75 is normally biased on by current provided by a relatively high valued base bias resistor and turns off in response to positive transitions of the sync pulses coupled by capacitor 78 to its base electrode. This occurs at the beginning of the so-called "back porch" interval of the sync pulse period which corresponds to the black level of the luminance signal (0 IRE units). When transistor 75 turns off, its collector voltage decreases from ground level to a negative voltage determined by a potential divider connected between ground and the negative supply rail ($-V_s$ volts). The negative transition of the collector voltage of transistor 75 is coupled by a timing capacitor 79 to the base electrode of transistor 76 which is normally biased on by current supplied to its base electrode from the positive supply rail ($+V_s$) via a relatively high valued base bias resistor. At turn-off, the collector voltage of transistor 76 increases to $+V_s$ by current supplied thereto via a collector load resistor. Transistor 76 will remain in this off condition until current supplied to timing capacitor 79 charges the capacitor to the potential $-V_s+V_{be}$ 76 at which time transistor 76 will again turn on, thereby terminating the output pulse.

For the illustrative element values, the output pulse period will be on the order of a few microseconds for supply voltages of plus and minus 15 volts. The pulse width should not exceed the width of the "back porch" interval since it is used, as previously explained, for identification of the 0 IRE unit reference level of the luminance signal component.

Figure 13:
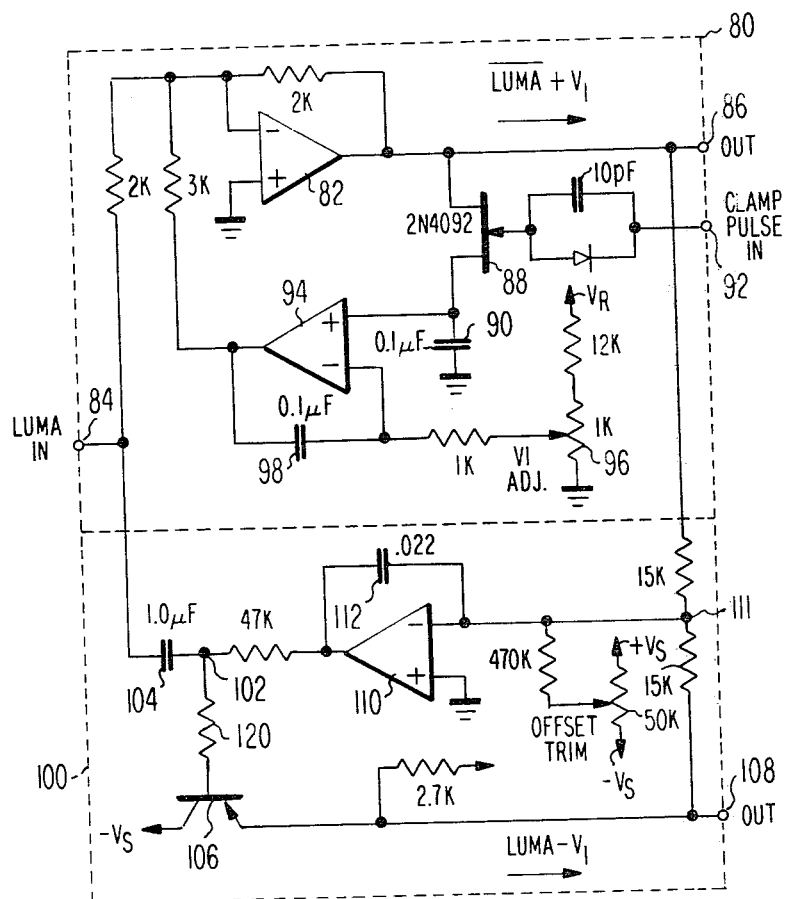

Each of the limit signal generators 46 and 48 of FIG. 2 may be implemented as shown in FIG. 13, the only difference being the polarity of a reference potential, $V_r$, supplied to a potential divider in the circuit. An important advantage of this feature of the invention is that since the circuits for generators 46 and 48 are physically identical, they exhibit essentially identical alternating current electrical characteristics (e.g., frequency response, transient response, delay times, etc.). The d.c. characteristics are also identical except, of course, for the polarity of the d.c. component of the output signals which, in turn, is determined by the selection of the polarity of $V_r$ and by the voltage divider adjustment.

The circuit comprises two interconnected voltage regulators 80 and 100 (outlined in phantom). The first regulator 80 inverts the luminance input signal, adds a d.c. component to it and regulates the d.c. component of the output signal at a fixed voltage level. The second regulator 100 inverts the d.c. component of the output signal of the first regulator (and rejects the a.c. component) and adds the inverted d.c. component to the luminance input signal to provide an output signal having a.c. and d.c. components identical in terms of magnitude to the output signal of the first regulator but of opposite polarity. An advantage of this novel combination of regulators is that only one adjustment is needed for setting the d.c. components of both of the regulator output signals.

In more detail, regulator 80 comprises an operational amplifier 82 having a non-inverting input terminal (+) connected to ground, an inverting input terminal (−) coupled to a luminance signal input terminal 84 via an input resistor and an output terminal connected to the regulator output terminal 86 and via a feedback resistor to the amplifier inverting input terminal (−). The input and feedback resistors of amplifier 82 are equal valued (illustratively 2000 Ohms each) and since the amplifier is connected in an inverting configuration (terminal "+" grounded) the luminance signal is inverted and has unity gain and supplied to output terminal 86.

It will be noticed that there are no means in regulator 80 for removing the d.c. component of the luminance input signal supplied to amplifier 82. None is necessary because, regardless of what the input d.c. level may be, the output signal d.c. level is periodically sampled during the "back porch" interval of the luminance signal, smoothed, and compared with a reference voltage $V_1$ to produce an error voltage that is fedback to amplifier 82 via a further input resistor (3000 Ohms). The feedback signal is applied in a sense to maintain the reference d.c. level (black level) of the output luminance signal equal to $V_1$.

The periodic sampling of the luminance output voltage is provided by an N-channel depletion mode transistor 88 connected between terminal 86 and one plate of an error voltage holding capacitor 90 the other plate of which is grounded. Transistor 88 is turned on during the back porch interval of the luminance signal by the pulses supplied to input terminal 92 from clamp pulse generator 44. Terminal 92 is connected to the gate of transistor 88 via the parallel combination of a diode and a capacitor. The diode is poled in a sense to prevent forward biasing of the gate junction of transistor 88. The capacitor provides an a.c. path for the clamp pulses. Capacitor 90 thus accumulates a charge and produces a smoothed output voltage representative of the d.c. component of the (inverted) luminance signal supplied to terminal 86.

The voltage stored in capacitor 90 is compared with the desired d.c. value of the output voltage (i.e., $V_1$) by means of a further operational amplifier 94 having a noninverting input terminal (+) connected to the junction of capacitor 90 and transistor 88, an inverting input terminal (−) coupled via an input resistor to the wiper of a potentiometer 96 and an output terminal coupled to its inverting input terminal via a feedback capacitor 98. Potentiometer 96 is coupled to ground at one end thereof and via a resistor to a source of reference potential $V_r$. The reference potential may be positive or negative depending on whether a positive or a negative d.c. component of the output signal at terminal 86 is desired. As previously explained, this is the only distinction between use of the circuit for generator 46 (where $V_r$ is positive) or use of the circuit for generator 48 (where $V_r$ is negative).

In the following discussion, it will be assumed that $V_r$ is a positive voltage. Under this assumption, $V_1$, the voltage produced at the wiper of potentiometer 96 will also be positive and may be set to a desired value by adjustment of the potentiometer. If the voltage stored by capacitor 90 is more positive than $V_1$, then amplifier 94 will feedback current to amplifier 82 in a sense to reduce the d.c. component of the output signal at terminal 86. This process reverses if $V_1$ is more positive than the capacitor 90 voltage. Accordingly, regardless of the d.c. reference level of the luminance input signal at terminal 84 the d.c. component of the output signal at terminal 86 will equal $V_1$.

In regulator 100 the a.c. component of the luminance signal supplied to terminal 84 is coupled to a summing node 102 via a d.c. blocking capacitor 104. Node 102 is coupled via a resistor to the base electrode of an emitter follower transistor 106, the emitter electrode of which is coupled directly to the regulator output terminal 108. Since no inversion is provided in the path between terminals 84 and 108 and the emitter follower transistor 106 has essentially unity voltage gain, the a.c. component of the output signal at terminal 108 is a replica of that of the luminance input signal at terminal 84.

The d.c. component ($-V_1$) of the signal at terminal 108 is regulated by means of a potential divider and an operational amplifier to be equal in amplitude and opposite in polarity to the d.c. component of the signal produced by regulator 80. The potential divider comprises a pair of equal valued resistors connected in series between output terminals 108 and 86, the common connection of the resistors (node 111) being coupled to the inverting input terminal of amplifier 110. The non-inverting input terminal of amplifier 110 is grounded and its output terminal is coupled to summing node 102 via a current limiting resistor and to the inverting input terminal via feedback capacitor 112. An offset trim adjustment potentiometer 114 is connected across sources of positive ($+V_s$) and negative ($-V_s$) supply voltage with the wiper thereof coupled to the inverting input terminal of amplifier 110 via a current limiting resistor.

In operation, a.c. components of the luminance signal are coupled without inversion to output terminal 108 as previously described. Since the a.c. component of the output signals at terminals 86 and 108 are of equal magnitude and opposite polarity, they tend to cancel at node 111, thus producing a signal proportional to the sum of the d.c. components of the two output signals. This signal is compared with ground reference potential by means of amplifier 110, which supplies a negative feedback signal to summing node 102 that regulates the d.c. component of the output signal at terminal 108 to be equal in magnitude but opposite in polarity to that at terminal 86 (capacitor 112 removes any residual a.c. components from the negative feedback signal). If, for example, the d.c. component $+V_1$ at terminal 86 should increase, the potential at node 111 will tend to become positive with respect to ground potential. Since the non-inverting input terminal of amplifier 110 is grounded, this tendency will cause the output voltage of amplifier 110 to become more negative, and making the emitter of transistor more negative until the node 111 voltage again equals ground level. As previously mentioned, this d.c. "tracking" feature of regulator 100 allows adjustment of the d.c. components of both output signals at terminals 86 and 108 by a single control element (potentiometer 96 in regulator 80).

What is claimed is:

1. A video signal limiter, comprising:
    input filter means for receiving a composite video input signal and producing separated luminance and chrominance signals;
    control signal generator means responsive to said luminance signal for producing four control signals, first and fourth ones of said control signals having an AC component inversely proportional to said luminance signal, second and third ones of said control signals having an AC component directly proportional to said luminance signal, each control signal having a respective DC component;
    regulator means in said generator means for regulating the DC components of the first and third control signals in proportion to a first reference voltage and for regulating the DC components of the second and fourth ones of said control signals in proportion to a second reference voltage;
    circuit means for limiting excursions in a first sense of said chrominance signal to the lesser in said first sense of said first and second control signals and for limiting excursions in a second sense of said chrominance signal to the lesser in said second sense of said third and fourth control signals to provide a symmetrically limited chrominance output signal; and means for combining said symmetrically limited chrominance output signal with said luminance signal to provide a composite video output signal.

2. A video signal limiter as recited in claim 1 wherein said regulator means comprises a separate regulator circuit for each of said control signals, a first one of said regulator circuits comprising:
 first means for periodically sampling a selected one of said control signals to produce a sampled signal representative of the DC component of said selected control signal;
 second means for comparing said sampled signal with a reference signal to produce a correction signal; and
 third means for combining said correction signal with said selected one of said control signals in a sense to regulate the value of said DC component of said selected signal at a value equal to a selected one of said reference voltages.

3. A video signal limiter as recited in claim 2 wherein a second one of said regulator circuits comprises means responsive to the DC component of said selected one of said control signals for regulating the DC component of a further one of said control signals at a value equal in magnitude and opposite in sign to that of the DC component of said selected one of said control signals.

4. A video signal limiter as recited in claim 1 wherein said circuit means comprises a cascade connection of a pair of complementary non-additive mixer circuits.

5. A video signal processor as recited in claim 1 further comprising frequency converter means interposed in a path between said circuit means and said output means for translating the frequency of said chrominance output signal to a lower frequency within a band of frequencies occupied by said luminance signal component.

6. A video signal processor as recited in claim 5 further comprising output filter means interposed in a path between said circuit means and said converter means for attenuating harmonic components of said chrominance output signal.

7. A video signal processor as recited in claim 1 further comprising:
 amplifier means interposed in a path between said input filter means and said circuit means for amplifying said chrominance signal component applied to said circuit means by a predetermined amount relative to said luminance signal component.

8. A video signal processor as recited in claim 1 wherein said composite video input signal is of PAL format and further comprising:
 PAL de-switcher means interposed in a path between said input filter means and said circuit means and responsive to a line frequency signal supplied thereto for inhibiting line-by-line phase alteration of a V component of said chrominance signal component supplied to said circuit means.

9. A video signal processor apparatus as recited in claim 1 further comprising preemphasis circuit means interposed in a path between said input filter means and said control signal generator means for preemphasizing said luminance signal component supplied to said control signal generator means.

10. A video signal processing apparatus as recited in claim 1 further comprising limiter circuit means interposed in a path between said input filter means and said output means for limiting excursions of the luminance signal component of said composite video output signal to a predetermined range of values.

* * * * *